United States Patent
Parikh et al.

(10) Patent No.: US 11,068,946 B2
(45) Date of Patent: *Jul. 20, 2021

(54) NUMA-BASED CLIENT PLACEMENT

(71) Applicant: VMware, Inc., Palo Alto, CA (US)

(72) Inventors: Aashish Parikh, Santa Clara, CA (US);
Puneet Zaroo, Santa Clara, CA (US);
Ganesha Shanmuganathan, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 16/352,131

(22) Filed: Mar. 13, 2019

(65) Prior Publication Data
US 2019/0213647 A1    Jul. 11, 2019

Related U.S. Application Data

(63) Continuation of application No. 14/249,267, filed on Apr. 9, 2014, now Pat. No. 10,248,977.

(60) Provisional application No. 61/869,679, filed on Aug. 24, 2013.

(51) Int. Cl.
| | | |
|---|---|---|
| G06F 9/50 | (2006.01) | |
| G06Q 30/02 | (2012.01) | |
| G06Q 50/06 | (2012.01) | |
| G06F 1/3209 | (2019.01) | |
| G06F 11/30 | (2006.01) | |
| H04L 29/08 | (2006.01) | |
| H04L 29/06 | (2006.01) | |
| G06F 1/26 | (2006.01) | |

(52) U.S. Cl.
CPC .......... *G06Q 30/0283* (2013.01); *G06F 1/26* (2013.01); *G06F 1/3209* (2013.01); *G06F 9/5094* (2013.01); *G06F 11/3062* (2013.01); *G06Q 50/06* (2013.01); *H04L 67/1002* (2013.01); *H04L 67/1097* (2013.01); *H04L 67/42* (2013.01); *G06F 9/505* (2013.01); *G06F 9/5044* (2013.01); *G06F 9/5077* (2013.01); *Y02D 10/00* (2018.01)

(58) Field of Classification Search
CPC ......... G06F 12/02; G06F 9/5077; H04L 63/10
See application file for complete search history.

(56) References Cited

U.S. PATENT DOCUMENTS

| | | | | |
|---|---|---|---|---|
| 6,230,114 B1 * | 5/2001 | Hellestrand | ............. | G06F 30/33 703/13 |
| 7,958,058 B2 * | 6/2011 | Man | ..................... | G06Q 10/103 705/301 |
| 8,260,840 B1 * | 9/2012 | Sirota | ................... | G06F 9/5061 709/201 |
| 9,116,803 B1 * | 8/2015 | Agrawal | ............. | G06F 9/45558 |

(Continued)

*Primary Examiner* — Barbara B Anyan
(74) *Attorney, Agent, or Firm* — Thomas Horstemeyer, LLP

(57) ABSTRACT

A management server and method for performing resource management operations in a distributed computer system takes into account information regarding multi-processor memory architectures of host computers of the distributed computer system, including information regarding Non-Uniform Memory Access (NUMA) architectures of at least some of the host computers, to make a placement recommendation to place a client in one of the host computers.

20 Claims, 4 Drawing Sheets

(56) References Cited

U.S. PATENT DOCUMENTS

| | | | |
|---|---|---|---|
| 2005/0071843 A1* | 3/2005 | Guo | G06F 9/505 |
| | | | 718/101 |
| 2008/0320482 A1 | 12/2008 | Dawson et al. | |
| 2009/0300713 A1 | 12/2009 | Sakai | |
| 2010/0005173 A1 | 1/2010 | Baskaran et al. | |
| 2010/0070784 A1 | 3/2010 | Gupta et al. | |
| 2012/0042312 A1 | 2/2012 | Isci et al. | |
| 2012/0053925 A1 | 3/2012 | Geffin et al. | |
| 2012/0131176 A1* | 5/2012 | Ferris | G06F 9/5072 |
| | | | 709/224 |
| 2012/0278800 A1* | 11/2012 | Nicholas | G06F 9/45558 |
| | | | 718/1 |
| 2013/0073730 A1* | 3/2013 | Hansson | G06F 9/5077 |
| | | | 709/226 |
| 2013/0227558 A1* | 8/2013 | Du | H04L 67/18 |
| | | | 718/1 |
| 2013/0339201 A1* | 12/2013 | Banerjee | G06Q 30/0207 |
| | | | 705/30 |
| 2013/0346972 A1* | 12/2013 | Anand | G06F 9/45533 |
| | | | 718/1 |
| 2014/0019966 A1* | 1/2014 | Neuse | G06F 9/45533 |
| | | | 718/1 |

\* cited by examiner

NUMA-BASED CLIENT PLACEMENT

CROSS REFERENCE TO RELATED APPLICATION

This application is a continuation of and claims the benefit of U.S. patent application Ser. No. 14/249,267, entitled "NUMA-BASED CLIENT PLACEMENT" and filed Apr. 9, 2014, which claims the benefit under 35 U.S.C. § 119(e) of U.S. Provisional Patent Application No. 61/869,679, entitled "NUMA-BASED CLIENT PLACEMENT" and filed Aug. 24, 2013, which are hereby incorporated by reference in their entireties.

BACKGROUND

Placement of resource-consuming clients, such as virtual machines (VMs), on the right hosts in a distributed computer system is an important factor in efficiently utilizing physical resources in the distributed computer system. An effective client placement strategy must meet the requirements of the clients and optimize several, sometimes conflicting, goals, while taking into consideration the complexities of the distributed computer system. Thus, the selection of appropriate hosts to place the clients is an important resource management process.

Even after the clients have been properly placed on the appropriate hosts in the distributed computer system, some of these clients may have to be moved or migrated to different hosts for various reasons. Again, the selection of appropriate hosts to which the clients will be migrated is an important resource management process.

When making client placement decisions, including client migration decisions, various parameters are considered in making the decisions. Some of the parameters considered relate to resources of hosts. As an example, raw capacity of each processor core of hosts may be used to make client placement decisions with respect to compute resources. However, the parameters currently considered in making client placement decisions may not produce the desired results.

SUMMARY

A management server and method for performing resource management operations in a distributed computer system takes into account information regarding multi-processor memory architectures of host computers of the distributed computer system, including information regarding Non-Uniform Memory Access (NUMA) architectures of at least some of the host computers, to make a placement recommendation to place a client in one of the host computers.

A method for performing resource management operations in a distributed computer system in accordance with an embodiment of the invention comprises receiving information regarding multi-processor memory architectures of host computers of the distributed computer system, including information regarding NUMA architectures of at least some of the host computers of the distributed computer system, receiving information regarding physical and virtual processors operating in the host computers of the distributed computer system, receiving virtual processor requirements of a client to be placed in one of the host computers of the distributed computer system, and recommending a target host computer of the host computers of the distributed computer system to place the client taking into account the information regarding the multi-processor memory architectures of the host computers of the distributed computer system, the information regarding the physical and virtual processors in the host computers of the distributed computer system and the virtual processor requirements of the client to be placed. In some embodiments, the steps of this method are performed when program instructions contained in a computer-readable storage medium are executed by one or more processors.

A management server in accordance with an embodiment of the invention comprises a resource management module configured to perform resource management operations in a distributed computer system. The resource management module is further configured to receive information regarding multi-processor memory architectures of host computers of the distributed computer system, including information regarding NUMA architectures of at least some of the host computers of the distributed computer system, receive information regarding physical and virtual processors operating in the host computers of the distributed computer system, receive virtual processor requirements of a client to be placed in one of the host computers of the distributed computer system, and recommend a target host computer of the host computers of the distributed computer system to place the client taking into account the information regarding the multi-processor memory architecture of the host computers of the distributed computer system, the information regarding the physical and virtual processors in the host computers of the distributed computer system and the virtual processor requirements of the client to be placed.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
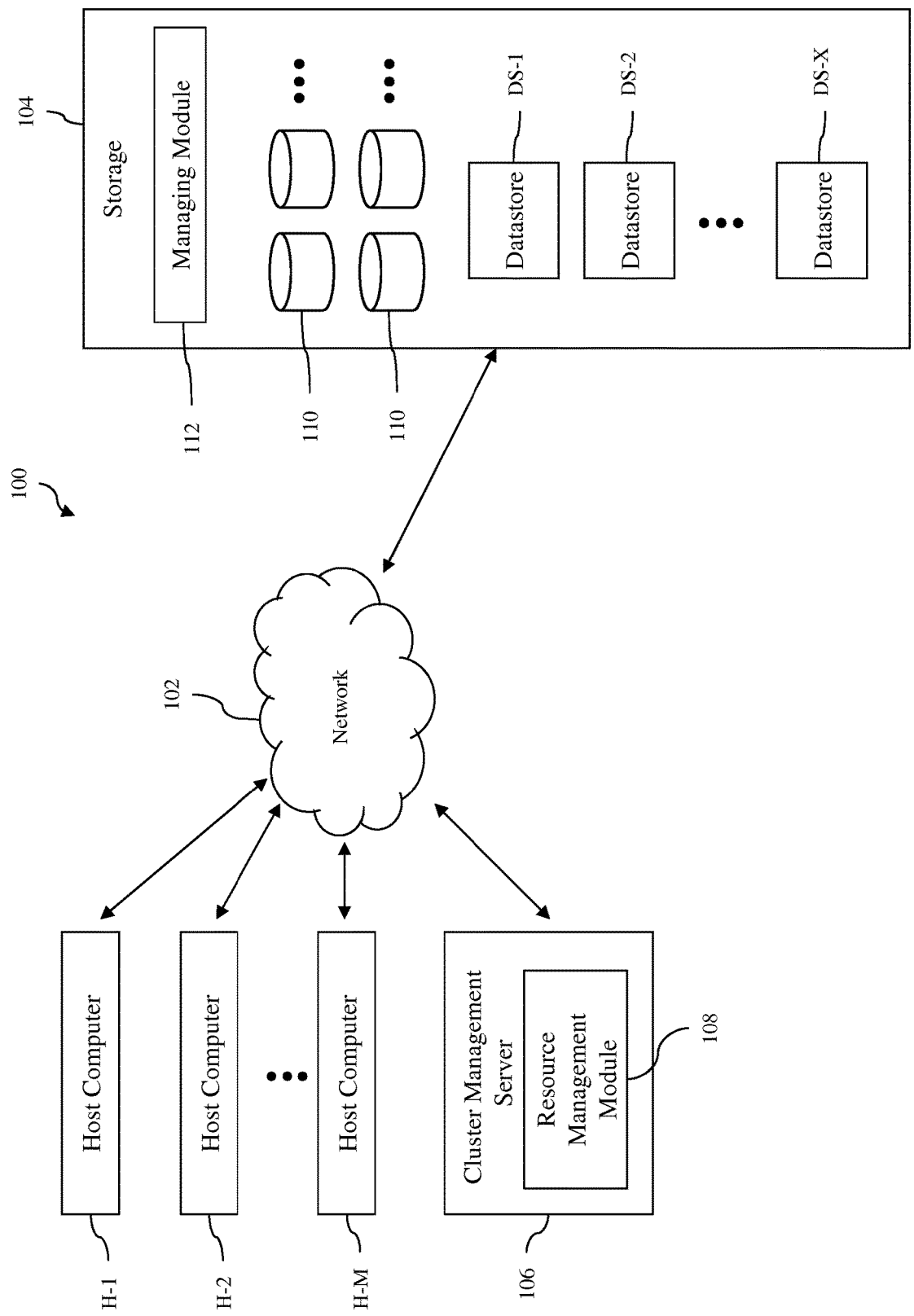
FIG. 1 is a block diagram of a distributed computer system in accordance with an embodiment of the invention.

Turning now to FIG. 1, a distributed computer system 100 in accordance with an embodiment of the invention is shown. As shown in FIG. 1, the distributed computer system includes a network 102, a cluster of host computers H-1, H-2 . . . H-M (where M is a positive integer), storage 104 and a management server 106 with a resource management module 108. The host computers, the storage and the management server are connected to the network. Thus, each of the host computers is able to access the storage via the network and may share the resources provided by the storage with the other host computers. Consequently, any process running on any of the host computers may also access the storage via the network.

The host computers H-1, H-2 . . . H-M are physical computer systems that hosts or supports one or more clients so that the clients are executing on the physical computer systems. The host computers may be servers that are commonly found in data centers. As used herein, the term "client" is any software entity that can run on a computer system, such as a software application, a software process or a virtual machine (VM). The host computers may be servers that are commonly found in datacenters. As an example, the host computers may be servers installed in a single server rack. However, in other embodiments, the host computers may be installed in multiple server racks in the same or different facilities.

Figure 2:
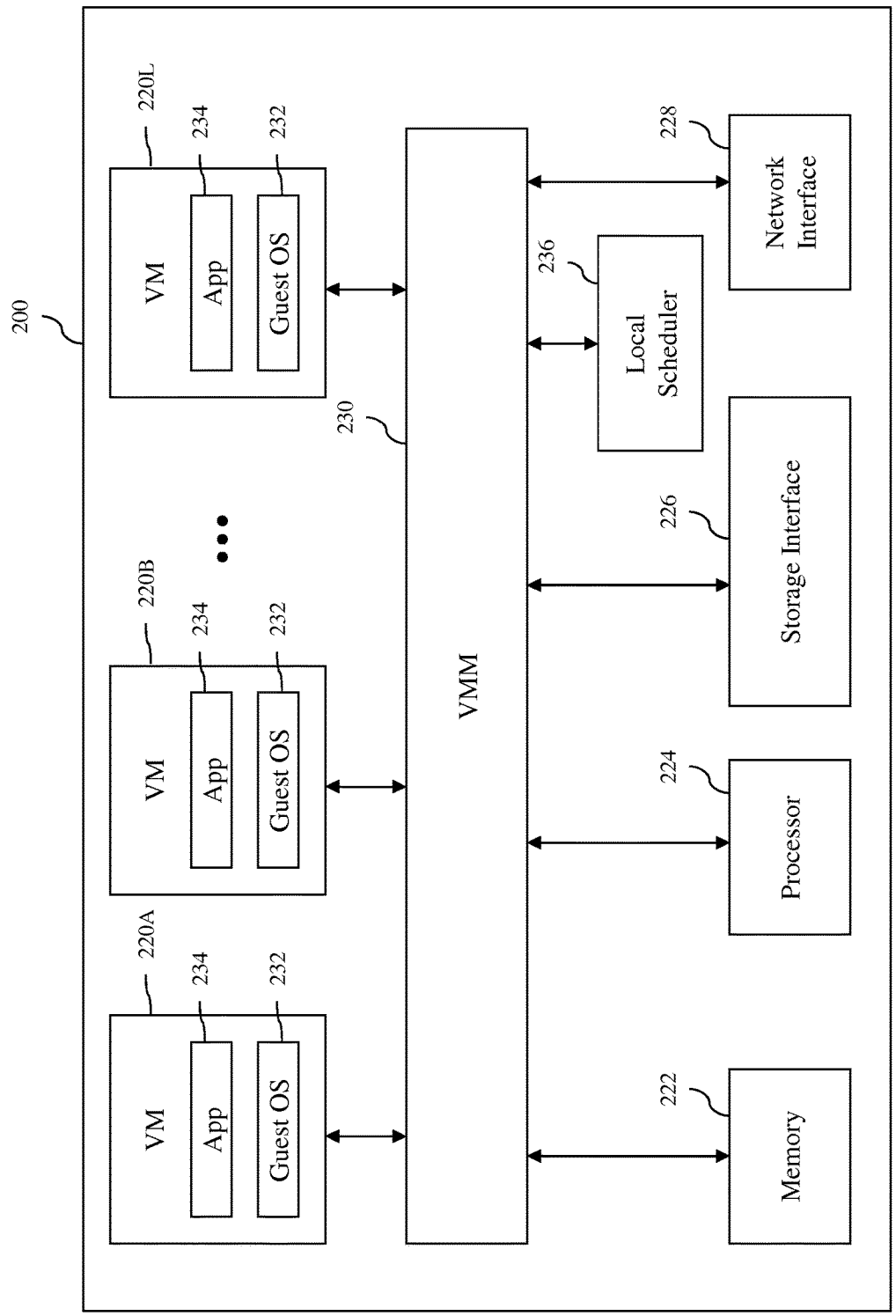
FIG. 2 is a block diagram of a host computer in accordance with an embodiment of the invention.

Turning now to FIG. 2, components of a host computer 200 that is representative of the host computers H-1, H-2 . . . H-M in accordance with an embodiment of the invention are shown. In FIG. 2, the physical connections between the various components of the host computer are not illustrated. In the illustrated embodiment, the host computer is configured to support a number of clients 220A, 220B . . . 220L (where L is a positive integer), which are VMs. The number of VMs supported by the host computer can be anywhere from one to more than one hundred. The exact number of VMs supported by the host computer is only limited by the physical resources of the host computer. The VMs share at least some of the hardware resources of the host computer, which include one or more system memories 222, one or more processors 224, a storage interface 226, and a network interface 228. Each system memory 222, which may be random access memory (RAM), is the volatile memory of the host computer. Each processor 224 can be any type of a processor, such as a central processing unit (CPU) commonly found in a server. In some embodiments, each processor may be a multi-core processor, and thus, includes multiple independent processing units or cores. The storage interface 226 is an interface that allows that host computer to communicate with the storage 104. As an example, the storage interface may be a host bus adapter or a network file system interface. The network interface 228 is an interface that allows the host computer to communicate with other devices connected to the network 102. As an example, the network interface may be a network adapter.

The host computer 200 may be configured according to any multi-processor memory architecture. In one implementation, the host computer may be configured according to Non-Uniform Memory Access (NUMA), and thus, may include a number of NUMA nodes. In this implementation, each NUMA code includes at least one processor 224 and at least one system memory 222, which is assigned to the processor as a "local" memory. In another implementation, the host computer may be configured according to Symmetric Multi-Processing (SMP) architecture. In this implementation, multiple processors share one or more system memories.

In the illustrated embodiment, the VMs 220A, 220B . . . 220L run on top of a virtual machine monitor 230, which is a software interface layer that enables sharing of the hardware resources of the host computer 200 by the VMs. However, in other embodiments, one or more of the VMs can be nested, i.e., a VM running in another VM. For example, one of the VMs may be running in a VM, which is also running in another VM. The virtual machine monitor may run on top of the host computer's operating system or directly on hardware of the host computer. In some embodiments, the virtual machine monitor runs on top of a hypervisor that is installed on top of the hardware components of the host computer. With the support of the virtual machine monitor, the VMs provide virtualized computer systems that give the appearance of being distinct from the host computer and from each other. Each VM includes a guest operating system 232 and one or more guest applications 234. The guest operating system is a master control program of the respective VM and, among other things, the guest operating system forms a software platform on top of which the guest applications run.

Similar to any other computer system connected to the network 102, the VMs 220A, 220B . . . 220L are able to communicate with other computer systems connected to the network using the network interface 228 of the host computer 200. In addition, the VMs are able to access the storage 104 using the storage interface 226 of the host computer.

The host computer 200 also includes a local scheduler 236 that operates as part of a resource management system, such as VMware Distributed Resource Scheduler (DRS), to manage resource requests made by the VMs 220A, 220B . . . 220L. Although the local scheduler is illustrated in FIG. 2 as being separate from the virtual machine monitor 230, the local scheduler may be implemented as part of the virtual machine monitor. In some embodiments, the local scheduler is implemented as software programs running on the host computer. However, in other embodiments, the local scheduler may be implemented using any combination of software and hardware.

Turing back to FIG. 1, the network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The storage 104 is used to store data for the host computers H-1, H-2 . . . H-M, which can be accessed like any other storage device connected to computer systems. In an embodiment, the storage can be accessed by entities, such as clients running on the host computers, using any file system, e.g., virtual machine file system (VMFS) or network file system (NFS). The storage includes one or more computer data storage devices 110, which can be any type of storage devices, such as solid-state devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The storage includes a storage managing module 112, which manages the operation of the storage. In an embodiment, the storage managing module is a computer program executing on one or more computer systems (not shown) of the storage. The storage supports multiple datastores DS-1, DS-2 . . . DS-X (where X is a positive integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers H-1, H-2 . . . H-M. For virtual machines, the datastores may be used to store virtual storage, e.g., virtual disks, used by each of the virtual machines, as well as other files needed to support the virtual machines. One or more datastores may be associated with one or more clusters. The same datastore may be associated with more than one cluster.

The management server 106 operates to monitor and manage the host computers H-1, H-2 . . . H-M. The management server may be configured to monitor the current configurations of the host computers and the clients running on the host computers, for example, virtual machines (VMs). The monitored configurations may include hardware configuration of each of the host computers, such as CPU type, multi-processor memory architecture and memory size, and/or software configurations of each of the host computers, such as operating system (OS) type and installed applications or software programs. The monitored configurations may also include client hosting information, i.e., which clients, e.g., VMs, are hosted or running on which host computers. The monitored configurations may also include client information. The client information may include size of each of the clients, virtualized hardware configuration of each of the clients, such as virtual CPU type and virtual memory size, software configuration of each of the clients, such as OS type and installed applications or software programs running on each of the clients, and virtual storage size for each of the clients. The client information may also include resource parameter settings, such as demand, limit, reservation and share values for various resources, e.g., CPU, memory, network bandwidth and storage, which are consumed by the clients. The demands of the clients for the consumable resources are determined by the host computers hosting the clients by monitoring the current usage of resources by the clients, e.g., CPU processing usage, memory usage, network usage and/or storage usage, and provided to the cluster management server.

The management server 106 may also perform operations to manage the clients and the host computers H-1, H-2 . . . H-M in the cluster. As illustrated in FIG. 1, in an embodiment, the cluster management server include the resource management module 108, which can be enabled by a user, to perform various resource management operations for the cluster, including resource allocation and load balancing operations. The cluster resource management module operates to perform at least some of the resource management operations based on multi-processor memory architecture information of the host computers. In other words, the resource management module takes into consideration the multi-processor memory architectures of the host computers in order to make resource management decisions. In particular, as described in more detail below, the resource management module makes placement decisions based on multi-processor memory architectures of the host computers to determine which host computers to place newly created clients or existing clients from other host computers.

In some embodiments, the management server 106 may be a physical computer. In other embodiments, the management server may be implemented as one or more software programs running on one or more physical computers, such as the host computer 200 shown in FIG. 2, or virtual computers, such as the 220A, 220B . . . 220L. In an implementation, the management server is a VMware vCenter™ server with at least some of the features available for such a server, and the resource management module 108 in the management server is VMware Distributed Resource Scheduler.

Figure 3:
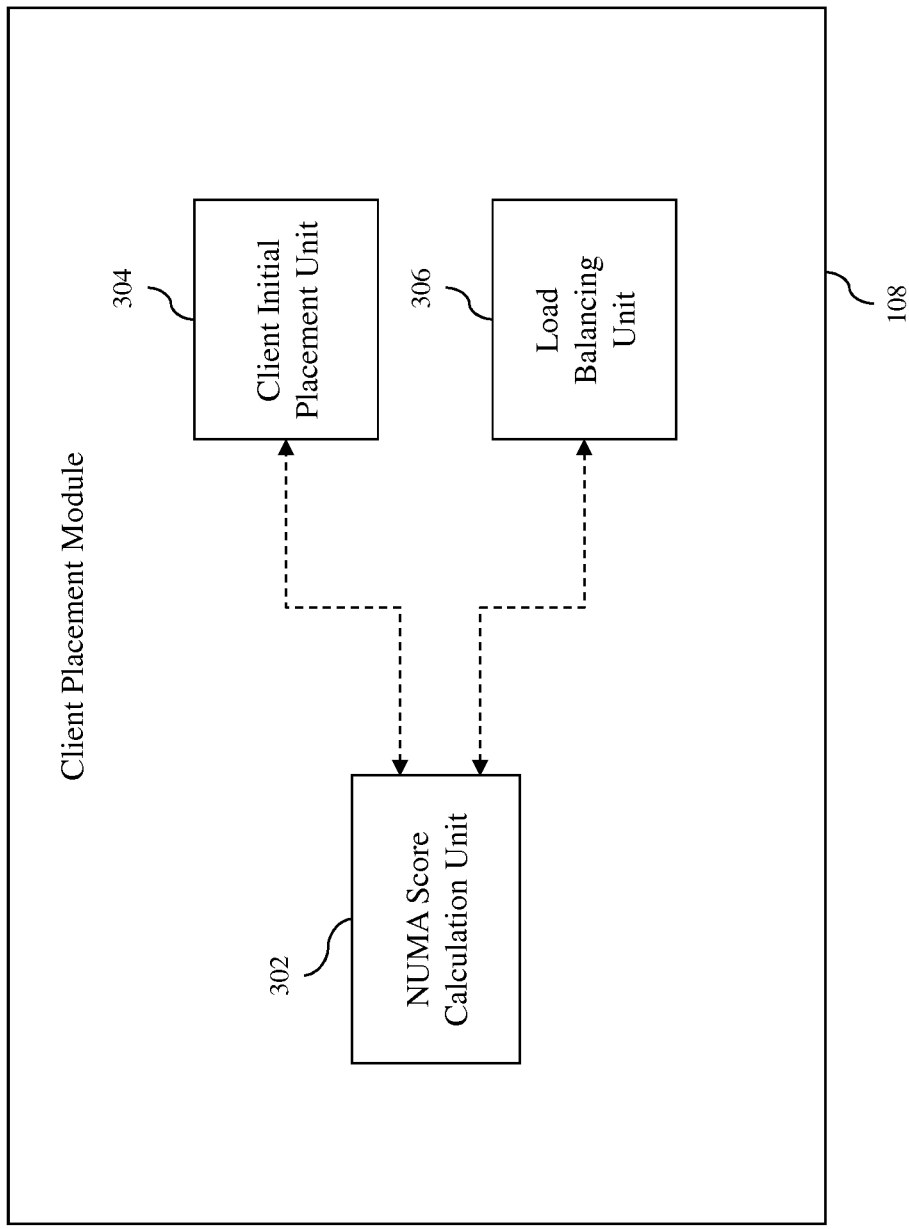
FIG. 3 is a block diagram of a resource management module included in the distributed computer system in accordance with an embodiment of the invention.

Turning now to FIG. 3, components of the resource management module 108 in accordance with an embodiment of the invention are shown. As illustrated in FIG. 3, the resource management module includes a NUMA score calculation unit 302, whose results are used by a client initial placement unit 304 and a load balancing unit 306 to execute their respective operations. The resource management module further includes other components commonly found in a cluster management server, such as a resource allocation unit 308 that distributes resources to various host computers in the cluster. The components of the resource management module may be implemented in any combination of hardware, software and firmware. In one implementation, these components of the resource management module are implemented as one or more software programs running in the management server using one or more processors associated with the management server.

The NUMA score calculation unit 302 of the resource management module 108 operates to compute a NUMA score for each host computer in the distributed computer system 100 regardless of whether the host computer is a NUMA machine or a non-NUMA machine. These NUMA scores can be used by other components of the resource management module to better perform their respective resource management operations. As an example, the NUMA scores can be used by the client initial placement unit 304 to place a new client into a more appropriate host computer by taking into account any NUMA topology of the possible host computers to place the new client. As used herein, NUMA topology refers to the arrangement of host computers, NUMA nodes, physical CPU cores (sometimes referred to herein as simply "CPUs") and virtual CPUs. Thus, NUMA topology will provide information regarding the number of NUMA nodes in each host computer and the number of physical or virtual CPUs associated with each of the NUMA nodes. As another example, the NUMA scores can be used by the load balancing unit to migrate one or more clients running on the host computers to balance workload in the cluster.

In an embodiment, the NUMA score calculation unit 302 computes a NUMA score for each host computer in the distributed computer system 100 using a virtual and physical processor ratio, which is defined herein as the number of virtual CPUs scheduled on that NUMA node (which may also include the virtual CPUs of the client to be placed) over the number of physical CPU cores in that NUMA node. The information regarding the number of virtual CPUs scheduled on each NUMA node of the NUMA host computers and the number of physical CPU cores in each NUMA node of the NUMA host computers are provided by the NUMA host computers. As for each non-NUMA host computer, the NUMA score calculation unit computes a NUMA score using a ratio of the number of virtual CPUs and the number of physical CPU cores in that non-NUMA host computer. The information regarding the number of virtual CPUs and the physical CPU cores in each non-NUMA host computer is provided by the non-NUMA host computers. The virtual and physical CPU information for each host computer may be provided by the VMM of that host computers or another component of the host computer.

In an implementation, each host computer, e.g., running an ESX server, provides its NUMA topology to the management server 106, e.g., running a vCenter server, as a vector. This vector may be a simple, static vector of the number of physical CPU cores per NUMA node in the host computer, which may be computed when the host computer boots up or at other specified time. In addition, each host computer provides an additional vector of the number of virtual CPUs scheduled on each of the NUMA nodes on that host computer. The number of virtual CPUs scheduled on each NUMA node may be an averaged value of the numbers of scheduled virtual CPUs for a predefined period of time. For each non-NUMA host computer, such as a SMP host computer, that host computer, e.g., running an ESX server, provides the number of its physical CPU cores to the management server, e.g., running a vCenter server. In addition, each non-NUMA host computer the number of virtual CPUs scheduled on that host computer, which may be averaged value of the numbers of scheduled virtual CPUs for a predefined period of time. Thus, in this implementation, the management server would know the number of NUMA nodes in the host computer and the number of CPU cores that are associated with each of these NUMA nodes. The management server would also know the number of physical CPU cores in each non-NUMA host computer. In addition, the management server would know the number of virtual CPUs scheduled in each NUMA node of a NUMA host computer or the number of virtual CPUs scheduled in each non-NUMA host computer.

In an embodiment, the NUMA score calculation unit 302 produces a cluster-wide NUMA score, which includes NUMA scores for all the NUMA nodes of the NUMA host computers in the cluster and NUMA scores for all the non-NUMA host computers in the cluster. The NUMA scores for the NUMA host computers can be computed in many ways using the information regarding virtual CPUs and physical CPUs for NUMA nodes of NUMA host computers or for non-NUMA host computers.

In a first method, each NUMA score may be the maximum value of the virtual and physical processor ratios, wherein each of the virtual and physical processor ratios is the number of virtual CPUs (which may also include the number of virtual CPUs for the new client to be placed) and the number of physical CPUs for a NUMA node. In this method, the NUMA score for a non-NUMA host computer would simply be the ratio of the number of virtual CPUs (including the number of virtual CPUs for the new client to be placed) and the number of physical CPUs for that host computer. This NUMA score computation method will be further explained below using an example of a cluster with two host computers H1 and H2.

In this example, both of the host computers H1 and H2 have eight (8) CPU cores in all. The host computer H1 has two (2) NUMA nodes with four (4) physical CPUs each. The CPU cores of the host computer H2 are true SMPs, and thus, the host computer H2 is not a NUMA machine. Each host computer has eight (8) VMs with one virtual CPU (1-vCPU) that are powered on. Let's assume that the new client to be placed is a new VM with four virtual CPUs. Assuming that the new VM would be placed on the first NUMA node of the host computer H1, the vector of the number of virtual CPUs over the number of physical CPUs is [8/4, 4/4] or [2,1]. Thus, the NUMA score for the first NUMA node of the host computer H1 is two (2), and the NUMA score for the second NUMA node of the host computer H1 is one (1). Since the host computer H2 is not a NUMA machine, its "vector" is really a scalar derived by averaging the ratio of the number of virtual CPUs over the number of physical CPUs on the entire host computer, which is 12/8 or 1.5. Consequently, the NUMA score for the host computer H2 is 1.5. Thus, in this example, assuming other placement parameters are the same between the host computers H1 and H2, the NUMA scores indicate that the new VM should be placed in the host computer H2.

The assumption made to compute the vector of the number of virtual CPUs over the number of physical CPUs for a NUMA host computer can be based on the current virtual and physical processor ratios for the NUMA nodes of the NUMA host computer. The NUMA score calculation unit 302 can assume that the client to be placed would be placed on a NUMA node with the lowest virtual and physical processor ratio. If the virtual and physical processor ratios are the same, then the NUMA score calculation unit may randomly select one of the NUMA nodes or a predetermined NUMA node between the NUMA nodes with the same virtual and physical processor ratios.

In a second method, each NUMA score may be the vector magnitude of the vector of virtual and physical processor ratios, wherein each of the virtual and physical processor ratios is the number of virtual CPUs (which may include the number of virtual CPUs for the new client to be placed) over the number of physical CPUs for NUMA nodes of a NUMA host computer. For a non-NUMA host computer, since its "vector" is really a scalar, the NUMA score would simply be the average of the ratio of the number of virtual CPUs (including the number of virtual CPUs for the new client to be placed) and the number of physical CPUs for that host computer. Using the above example of the host computers H1 and H2, the NUMA score of the host computer H1 will be square root of $(2^2+1^2)$ or square root of five (5) and the NUMA score of the host computer H2 will be 1.5. Thus, in this example, assuming other placement parameters are the same between the host computers H1 and H2, the NUMA scores indicate that the new VM should be placed in the host computer H2.

In a third method, each NUMA score may be the k-th percentile of the virtual and physical processor ratios, where k is a number less than one hundred (100), wherein each of the virtual and physical processor ratios is the number of virtual CPUs (which may include the number of virtual CPUs for the new client to be placed) and the number of physical CPUs for the NUMA nodes in a NUMA host computer. For a non-NUMA host computer, the NUMA score may be the k-th percentile of the average of the ratio of the number of virtual CPUs (including the number of virtual CPUs for the new client to be placed) in that host computer and the number of physical CPUs in that host computer. Using the above example of the host computers H1 and H2, if 90 percentile is used, then the NUMA score of the host computer H1 will be 1.8, which is the 90 percentile of the highest ratio for the host computer H1, i.e., two (2). The NUMA score of the host computer H2 will be 1.35, which is the 90 percentile of the ratio for the host computer H2, i.e., 1.5. Thus, in this example, assuming other placement parameters are the same between the host computers H1 and H2, the NUMA scores indicate that the new VM should be placed in the host computer H2.

Other alternative methods may also be utilized to compute the NUMA scores for the possible host computers to place a new client using other statistical measures, such as standard deviation, Jain's fairness index, etc.

The cluster-wide NUMA score or per-host NUMA scores is/are then provided to other components of the resource management module 108, e.g., the client initial placement unit 304 and the load balancing unit 306, to be used to make resource management decisions.

The client initial placement unit 304 of the resource management module 108 operates to determine initial placement of new clients created in the cluster. Thus, the client initial placement unit selects a candidate host computer in the distributed computer system 100 appropriate for the initial placement of each new client. The client initial placement unit may also determine the datastore for each new client for initial placement. The client initial placement unit selects candidate host computers to place new clients based on at least the NUMA topology of some of the host computers. In an embodiment, the client initial placement unit selects the candidate host computers to place new clients based on at least the NUMA scores provided by the NUMA score calculation unit 302. The client initial placement unit may also select the candidate host computers based on other factors regarding the host computers in the cluster. These factors may include compute resources of the host computers, e.g., the CPU and RAM resources, storage resources of the host computers, network resources of the host computers, e.g., network bandwidth, and policies of the host computers, e.g., affinity and anti-affinity rules for clients in the host computers. An affinity policy between two clients will ensure that both clients will be placed on the same host computer. An anti-affinity policy between two clients will ensure that both clients will be placed on different host computers.

In an embodiment, the client initial placement unit 304 uses the NUMA scores as one of several factors or metrics to make placement decisions. Some or all of these different factors could be weighted or scaled to give more weight to certain factors in making placement decisions. In addition, some or all of these different factors could be normalized or scaled to apply same or similar weight to the different factors in making placement decisions. In a particular implementation, the host computer with a lower NUMA score will be recommended for placement over another host computer with a higher NUMA score, assuming other factors are the same for both host computers.

The load balancing unit 306 of the resource management module 108 operates to balance the load on the host computers in the distributed computer system 100, which may involve migrating one or more clients from one host computer to another host computer. The load balancing unit will migrate a client from one host computer to another host computer in the distributed computer system by taking into a number of factors or metrics, including the NUMA scores provided by the NUMA score calculation unit 302. The load balancing unit selects a candidate host computer in the distributed computer system 100 that will result in a better load balance condition. The load balancing unit may also determine, if necessary, the datastore for the client being migrated. The load balancing unit selects candidate host computers to migrate existing clients to other host computers based on at least the NUMA topology of some of the host computers. In an embodiment, the load balancing unit selects the candidate host computers to migrate existing clients based on at least the NUMA scores provided by the NUMA score calculation unit 302. The load balancing unit may also select the candidate host computers based on other factors regarding the host computers in the cluster. These factors may include compute resources of the host computers, e.g., the CPU and RAM resources, storage resources of the host computers, network resources of the host computers, e.g., network bandwidth, and policies of the host computers, e.g., affinity and anti-affinity rules for clients in the host computers. These factors may further include other known factors or metrics that are commonly used to make load balancing decisions, such as balance metric and cost-benefit metric to rank recommendations presented to users.

In an embodiment, the load balancing unit 306 uses the NUMA scores as one of several factors or metrics to make migration decisions, which would include placement decisions. Some or all of these different factors could be weighted or scaled to give more weight to certain factors in making migration decisions. In addition, some or all of these different factors could be normalized or scaled to apply same or similar weight to the different factors in making migration decisions. In a particular implementation, the host computer with a lower NUMA score will be recommended for migrating a client over another host computer with a higher NUMA score, assuming other factors are the same for both host computers. That is, the load balancing unit will recommend migrating the client to the host computer with a lower NUMA score, assuming other factors are the same for both host computers.

The operation of the resource management module 108 will now be described with references to FIGS. 1 and 3. The resource management module may be automatically initiated at set periodic intervals. As an example, the resource management module may be automatically initiated every five (5) minutes. The resource management module may also be initiated when a new client, e.g., a VM, is created in the distributed computer system 100 by a user or by some operational process in the distributed computer system. The resource management may also be manually initiated by a user or initiated by some operational process in the distributed computer system. When initiated, the resource management module queries at least some of the host computers H-1, H-2 ... H-M in the distributed computer system to request information regarding the host computers, such as hardware information and NUMA topological information. In response, the host computers transmit the requested information to the resource management module. In a particular implementation, each NUMA host computer transmits a vector of information that includes the number of NUMA nodes and the number of physical CPU cores on each of the NUMA nodes. In this implementation, each non-NUMA host computer simply transmits the number of the physical CPU cores in that host computer. In addition, each NUMA host computer transmits a vector of the running average of the number of virtual CPUs scheduled on each of the NUMA nodes of that NUMA host computer. Each non-NUMA host computer simply transmits the number of virtual CPUs running in that host computer. In addition, the resource management module also receives requirements of a client to be placed, in particular, the number of virtual CPUs. The requirements of the client to be placed may be received from any source, such as a user inputting the requirements, the host computers or storage that maintains information regarding the client requirements.

The NUMA score calculation unit 302 of the resource management module 108 receives the information regarding the host computers H-1, H-2 ... H-M in the distributed computer system 100, including the multi-processor architectures of the host computers and the virtual and physical processors operating in the host computers, and the requirements of the client to be placed. The NUMA score calculation unit computes the NUMA score for each of the host computers. In an embodiment, the NUMA score calculation unit computes the NUMA scores using statistical measures of virtual and physical processor ratios for each NUMA node for the NUMA host computers or for the entire host computer for the non-NUMA host computers. As an example, the NUMA score for each host computer may be the maximum value of the virtual and physical processor ratios for that host computer. As another example, the NUMA score for each host computer may be the vector magnitude of the vector of virtual and physical processor ratios for that host computer. As another example, the NUMA score for each host computer may be the k-th percentile of the virtual and physical processor ratios for that host computer, where k is a number less than one hundred (100). Other statistical measures, such as standard deviation, Jain's fairness index, etc., may also be used to compute the NUMA scores. In a particular implementation, the NUMA score calculation unit produces a cluster-wide NUMA score that contains NUMA scores for all the host computers being considered for placement of the client.

The cluster-wide NUMA score produced by the NUMA score calculation unit 302 may then be used by the client initial placement unit 304 of the resource management module 108, along with other factors or metrics, to recommend a target host computer in the distributed computer system 100 to place the client. Alternatively, the cluster-wide NUMA score produced by the NUMA score calculation unit may be used by the load balancing unit 306 of the resource management module, along with other factors or metrics, to recommend a target host computer in the distributed computer system to migrate the client from the current host computer in the distributed computer system. As a result, the client initial placement unit and the load balancing unit can make better placement decisions by taking into consideration the NUMA topologies of the host computers in the distributed computer system.

Figure 4:
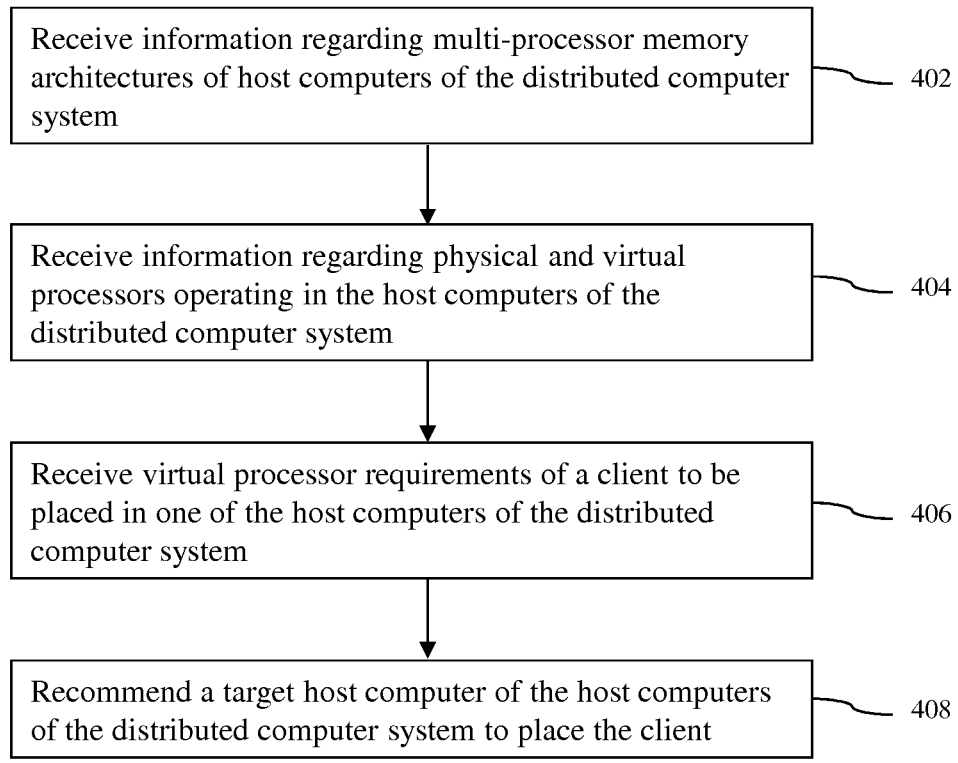
FIG. 4 is a flow diagram of a method for performing resource management operations in a distributed computer system in accordance with an embodiment of the invention.

A method for performing resource management operations in a distributed computer system in accordance with an embodiment of the invention is described with reference to a flow diagram of FIG. 4. At block 402, information regarding multi-processor memory architectures of host computers of the distributed computer system, including information regarding NUMA architectures of at least some of the host computers of the distributed computer system, is received. At block 404, information regarding physical and virtual processors operating in the host computers of the distributed computer system is received. At block 404, virtual processor requirements of a client to be placed in one of the host computers of the distributed computer system are received. At block 406, a target host computer of the host computers of the distributed computer system to place the client is recommended taking into account the information regarding the multi-processor memory architecture of the host computers of the distributed computer system, the information regarding the physical and virtual processors in the host computers of the distributed computer system and the virtual processor requirements of the client to be placed.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method comprising:
   transmitting a query for Non-Uniform Memory Access (NUMA) data to a plurality of host computers of a distributed computer system;
   receiving, from a respective host computer, data regarding at least one virtual processor associated with a NUMA node operating in the respective host computer;
   receiving a virtual processor requirement of a client to be placed in one of the plurality of host computers of the distributed computer system; and
   determining a target host computer of the distributed computer system for placing the client based on the data regarding the at least one virtual processor in the respective host computer of the distributed computer system and the virtual processor requirement of the client to be placed.

2. The method of claim 1, wherein the data regarding the at least one virtual processor associated with the NUMA node further includes at least one physical processor associated with the NUMA node operating in the respective host computer.

3. The method of claim 1, wherein the at least one virtual processor represents an average quantity of virtual processors operating for the NUMA node for a predefined period of time.

4. The method of claim 1, wherein transmitting the query for NUMA data to the plurality of host computers of the distribution computer system is performed in an instance in which a generation of the client in the distributed computer system has occurred.

5. The method of claim 1, further comprising:
   determining a NUMA score for the NUMA node associated with the respective host computer based on a virtual and physical processor ratio associated with the NUMA node.

6. The method of claim 5, wherein the determining the NUMA score for the NUMA node associated with the respective host computer further comprises selecting a maximum value from the virtual and physical processor ratio for the respective host computer.

7. The method of claim 5, wherein the determining the NUMA score for the NUMA node associated with the respective host computer further comprises determining a vector magnitude of a vector of the virtual and physical processor ratio for the respective host computer.

8. A non-transitory computer-readable storage medium comprising executable instructions which, when executed by a computing device, cause the computing device to at least:
   transmit a query for Non-Uniform Memory Access (NUMA) data to a plurality of host computers of a distributed computer system;
   receive, from a respective host computer, data regarding at least one virtual processor associated with a NUMA node operating in the respective host computer;
   receive a virtual processor requirement of a client to be placed in one of the plurality of host computers of the distributed computer system; and
   determine a target host computer of the distributed computer system for placing the client based on the data regarding the at least one virtual processor in the respective host computer of the distributed computer system and the virtual processor requirement of the client to be placed.

9. The non-transitory computer-readable storage medium of claim 8, wherein the data regarding the at least one virtual processor associated with the NUMA node further includes at least one physical processor associated with the NUMA node operating in the respective host computer.

10. The non-transitory computer-readable storage medium of claim 8, wherein the at least one virtual processor represents an average quantity of virtual processors operating for the NUMA node for a predefined period of time.

11. The non-transitory computer-readable storage medium of claim 8, wherein transmitting the query for NUMA data to the plurality of host computers of the distribution computer system is performed in an instance in which a generation of the client in the distributed computer system has occurred.

12. The non-transitory computer-readable storage medium of claim 8, wherein the executable instructions are further configured to cause the computing device to at least:
   determine a NUMA score for the NUMA node associated with the respective host computer based on a virtual and physical processor ratio associated with the NUMA node.

13. The non-transitory computer-readable medium of claim 12, wherein the determining the NUMA score for the NUMA node associated with the respective host computer further comprises selecting a maximum value from the virtual and physical processor ratio for the respective host computer.

14. The non-transitory computer-readable medium of claim 12, wherein the determining the NUMA score for the NUMA node associated with the respective host computer further comprises determining a k-th percentile of the virtual and physical processor ratio for a particular host computer, where k is a number less than 100.

15. A system, comprising:
   a computing device that comprises a processor and memory; and
   program instructions executable in the computing device that, when executed by the computing device, cause the computing device to at least:
      transmit a query for Non-Uniform Memory Access (NUMA) data to a plurality of host computers of a distributed computer system;
      receive, from a respective host computer, data regarding at least one virtual processor associated with a NUMA node operating in the respective host computer;
      receive a virtual processor requirement of a client to be placed in one of the plurality of host computers of the distributed computer system; and
      determine a target host computer of the distributed computer system for placing the client based on the data regarding the at least one virtual processor in the respective host computer of the distributed computer system and the virtual processor requirement of the client to be placed.

16. The system of claim 15, wherein the data regarding the at least one virtual processor associated with the NUMA node further includes at least one physical processor associated with the NUMA node operating in the respective host computer.

17. The system of claim 15, wherein the at least one virtual processor represents an average quantity of virtual processors operating for the NUMA node for a predefined period of time.

18. The system of claim 15, wherein transmitting the query for NUMA data to the plurality of host computers of the distribution computer system is performed in an instance in which a generation of the client in the distributed computer system has occurred.

19. The system of claim 15, wherein the program instructions are further configured to cause the computing device to at least:
   determine a NUMA score for the NUMA node associated with the respective host computer based on a virtual and physical processor ratio associated with the NUMA node.

20. The system of claim 19, wherein the determining the NUMA score for the NUMA node associated with the respective host computer further comprises selecting a maximum value from the virtual and physical processor ratio for the respective host computer.

* * * * *